US012378771B2

(12) United States Patent
Del Piero

(10) Patent No.: US 12,378,771 B2
(45) Date of Patent: Aug. 5, 2025

(54) PRESSURE SPRAY WASHER FOR CLEANING GUTTERS

(71) Applicant: Paul Del Piero, Sunrise Beach, TX (US)

(72) Inventor: Paul Del Piero, Sunrise Beach, TX (US)

(*) Notice: Subject to any disclaimer, the term of this patent is extended or adjusted under 35 U.S.C. 154(b) by 571 days.

(21) Appl. No.: 17/821,629

(22) Filed: Aug. 23, 2022

(65) Prior Publication Data

US 2023/0101067 A1 Mar. 30, 2023

Related U.S. Application Data

(60) Provisional application No. 63/249,978, filed on Sep. 29, 2021.

(51) Int. Cl.
*E04D 13/076* (2006.01)
*B05B 1/14* (2006.01)

(52) U.S. Cl.
CPC ............ *E04D 13/0765* (2013.01); *B05B 1/14* (2013.01)

(58) Field of Classification Search
CPC .............................. E04D 13/0765; B05B 1/14
USPC .......................................................... 239/532
See application file for complete search history.

(56) References Cited

U.S. PATENT DOCUMENTS

| | | | | |
|---|---|---|---|---|
| 4,150,793 | A | | 4/1979 | Russo |
| 4,182,497 | A | | 1/1980 | Ferreira et al. |
| 4,183,368 | A | | 1/1980 | Husted |
| 4,303,348 | A | | 12/1981 | O'Brien |
| 4,304,498 | A | | 12/1981 | George |
| 4,349,039 | A | | 9/1982 | Egger |
| 4,363,335 | A | | 12/1982 | Tapper |
| 4,673,129 | A | | 6/1987 | Kologiy |
| 4,756,043 | A | | 7/1988 | Hazelet |
| 4,978,241 | A | | 12/1990 | Lawson |
| 5,022,586 | A | | 6/1991 | Putnam |
| 5,386,942 | A | | 2/1995 | Dietle |
| 5,390,853 | A | | 2/1995 | Ellul |
| 5,725,322 | A | * | 3/1998 | Evans .................. B05B 7/2443 401/289 |
| 5,727,580 | A | | 3/1998 | Patterson |
| 8,409,365 | B2 | | 4/2013 | Cox |
| 2006/0289036 | A1 | | 12/2006 | Hilton |
| 2009/0127349 | A1 | | 5/2009 | Deleo |

* cited by examiner

*Primary Examiner* — Steven J Ganey
(74) *Attorney, Agent, or Firm* — Egbert, McDaniel & Swartz, PLLC

(57) ABSTRACT

A pressure spray washer for cleaning gutters has a body having a curved outer surface. The body has an internal channel opening at one end of said body, and a plurality of orifices extending through the body so as to have one end opening to the internal channel and an opposite end opening at an exterior surface of the body. The body has a connector at one end of the internal channel, which is adapted to connect with a source of a pressurized fluid.

16 Claims, 4 Drawing Sheets

PRESSURE SPRAY WASHER FOR CLEANING GUTTERS

RELATED U.S. APPLICATIONS

The present application claims priority from U.S. patent application Publication No. 63/249,978, filed on Sep. 29, 2021, and entitled "Pressure Spray Washer for Cleaning Gutters".

BACKGROUND OF THE INVENTION

1. Field of the Invention

The present invention relates to devices for the cleaning of gutters. More particularly, the present invention relates to devices that emit a pressurized fluid so as to remove leaves and debris from the interior of a gutter.

2. Description of Related Art Including Information Disclosed Under 37 CFR 1.97 and 37 CFR 1.98

Gutters provide an effective means of diverting water from a rooftop to downspouts. However, debris builds up in gutters over time. For effective use, the gutters must be cleaned. While gutters can be cleaned by hand, this approach usually requires ladders and can be dangerous and time-consuming. If a ladder is not available, one often climbs on the roof to clean the gutter. This increases the likelihood of a fall. Various devices have been developed to make gutter cleaning easier.

Wand-type cleaning devices generally allow a person to stand on the ground and clean a gutter. Wand-type devices generally consist of an elongated conduit having one end attached to a water hose or other water source. The other end typically has a water outlet or it may have other fixed cleaning implements. This outlet end is generally reversely bent so that water emitted from the outlet is directed down into the gutter. The attached cleaning implements are used to agitate and dislodge compacted debris and assist in breaking it into smaller pieces. The flow of water from the device directs the loosened debris either out of the gutter or toward the downspout. Typical wand devices have one water outlet or nozzle adapted to spray a waterjet into the gutter to dislodge and break-up debris while the flow of water in the gutter carries the debris away. Some devices include two nozzles or outlets that may be used alternately or simultaneously.

While wand-type devices provide a more efficient means of cleaning gutters, they do exhibit some problems. Water emitted from the wand can have significant force. For lower rooflines and gutters, this may not be a problem since a person operates the device with a water conduit that is short enough to limit the moment of force from the wand, and so the person is able to hold the device in place. However, if the water conduit is long, the moment of force may be too great to hold the wand in place during use. This is especially true when the water supply is pressurized using a pressure washer or pump to increase the force that dislodges compacted material from the gutter.

To ensure the device remains in place, various implements have been developed and adapted into the wand-type devices. These aids include cleaning tools adapted to hook over the outer edge of the gutter, guides designed to roll along the gutter edge, or devices designed to roll inside the gutter. These devices have their own limitations in terms of feasibility, usefulness with a variety of gutter systems, and ease-of-use depending on gutter height and water pressure. Not all gutters may be constructed the same and may not be able to take advantage of the guides in these devices. Also, high-pressure systems still tend to be difficult to manage since the waterjet emitted from the device forces the device away from the gutter. This negative effect is magnified when a person attempts to use a device from a personnel lift or personnel basket.

Oftentimes, the attachments are operated at the end of a telescoping extension pole in order to clean gutters that are high off the ground. When using a long extension pole, it is critical for the gutter cleaning attachment to have minimal weight and minimal recoil from the height-pressure spray. A common, inexpensive gutter cleaning attachment uses a curved steel lance with a single nozzle to spray pressurized water into gutters and flush out debris. While this design is lightweight, the strong recoil force from the spray nozzle makes the device difficult to control. This design risks damaging roof and siding materials from the high-pressure spray and is difficult to direct with accuracy especially when connected to a long telescoping pole (as may be needed to clean gutters that are high off the ground).

An alternative spray attachment design that is sold online and at stores, such as Home Depot, has opposing rotating nozzles. The opposing nozzles eliminate recoil and the side-facing spray is less likely to damage roofing and siding. However, the long cone-shaped nozzles catch on internal gutter hangers. The opposed rotation causes the left side jet to rotate debris toward the roof and away from the edge of the gutter. This is not desirable.

There are many other pressure washer gutter cleaner designs that are sold. Another example somewhat reduces recoil compared to the basic design described above and slightly reduces catching on gutter braces compared with previous devices. A "Gutter Ball" has been developed which utilizes a spherical body to stabilize the spray nozzles inside the gutter. However, the protruding, threaded-in nozzles catch on gutter hangers and the increased weight of the device makes it less desirable for use on long telescoping poles.

In the past, various patents and patent application publications have issued with respect to gutter cleaning devices. For example, an early patent is that of U.S. Pat. No. 4,150,793, issued on Apr. 24, 1979 to A. Russo. This patent describes a gutter cleaning apparatus having a housing having a first opening and a second opening for delivering fluid under pressure into a rain gutter mounted on a building. The openings are diametrically opposed and the flow of fluid through the openings is controlled by a valve that alternately opens one opening and closes the other. The valve is controlled by increasing and decreasing the fluid pressure in the housing. When fluid pressure is at a pre-determined lower level, the valve is in a neutral position between two openings. A stream deflector plate extends from the bottom of the valve and, depending on which direction the deflector plate is positioned, increases the pressure in the housing so as to cause the valve to move to one of the openings.

U.S. Pat. No. 4,182,497, issued on Jan. 8, 1980 to Ferreira et al., teaches a gutter cleaning device that is adapted to remove leaves and other debris from household gutters. This employs a generally flat blade-like working head connected to an elongated hollow handle. Fluid is directed through the handle and into the working head. The fluid exits through a plurality of discharge openings provided in each of the side walls forming the head so as to direct the plurality of streams along the inside surface of the gutter.

U.S. Pat. No. 4,183,368, issued on Jan. 15, 1980 to G. V. Husted, shows an eave trough flushing system that includes a nozzle-mounting bracket for mounting a nozzle in a position to inject water into and lengthwise along an eave trough. The mounting bracket laterally spans the eave trough and is configured to engage the eave trough in a manner that permits easy installation.

U.S. Pat. No. 4,303,348, issued on Dec. 1, 1981 to E. P. O'Brien, provides a gutter cleaning device having a pair of oppositely directed curved scraper blades mounted to the end of a reversely bent handle. The handle serves as a conduit for water. Tabs are formed on the end of the conduit to clamp a removable brush at the end of the conduit.

U.S. Pat. No. 4,304,498, issued on Dec. 8, 1981 to M. F. George, provides a gutter cleaning apparatus that has a cleaning head removably attached to a handle. The cleaning head has an interior sloping surface which slopes up from two side edges. The side edges are spaced apart from the handle in the direction of the movement of the cleaning head toward a central upper extension connector that is removably attached to the handle. The sloping surface is defined by a front wall and a rear wall. The handle is removably attached to the central extension connector of the cleaning head. The sloping surface of the cleaning head is adapted to transfer debris in the gutter from each side edge, up the surface, and over the front wall lip during lateral movement of the cleaning head in the gutter.

U.S. Pat. No. 4,349,039, issued on Sep. 14, 1982 to R. S. Egger, shows a home roof gutter sweep for traveling movement on the edge of a rain gutter. The gutter sweep has a vertical portion to which is rigidly secured a fixed tubular part of a rotary valve. Support rollers are carried on horizontal axes which are, in turn, carried by a vertical portion of the frame. The support rollers support the device for travel on the outer edge of a rain gutter. The frame continues to a U-shaped portion providing a horizontal frame portion. The fixed tubular valve part has at least one nozzle connected therewith so as to direct fluid in opposite directions in the rain gutter.

U.S. Pat. No. 4,363,335, issued on Dec. 14, 1982 to W. R. Tapper, provides a gutter cleaner for cleaning leaves and other debris from eave troughs and similar gutters through the use of water pressure. The device has a carrier adapted for engagement with the forward lip of an eave trough. The carrier supports a high-pressure water nozzle which is adapted to be connected to a source of water under pressure. The carrier is propelled manually by means of an elongated handle along the length of the eave trough as the water stream flushes debris from the trough.

U.S. Pat. No. 4,673,129, issued on Jun. 16, 1987 to G. J. Kologiy, discloses a gutter cleaner that has a tubular handle bent at a right angle at one end so as to form a short length and having a conventional garden hose fitting affixed to the other end. A valve is mounted in-line in the handle. A wand is carried on the handle and is screwed to the garden hose within the housing.

U.S. Pat. No. 4,756,043, issued on Jul. 12, 1988 to J. E. Hazelet, shows a gutter and/or downspout cleaner that employs a water spray and a mechanical snake to break-up and dislodge debris. The cleaner is sufficiently long so that an individual who is standing at ground level can arrange the water spray and snake above a gutter or downspout to be cleaned.

U.S. Pat. No. 4,978,241, issued on Dec. 18, 1990 to T. Lawson, provides a roof gutter cleaning device that has a stabilizing roller and a supporting roller. The supporting roller rolls along the bottom of the gutter. The stabilizing roller rolls along the lip of the gutter so as to stabilize movement of the cleaning apparatus. An elongated hollow handle delivers water or a treatment liquid to the spray nozzle in order to spray the water or the treatment liquid into the gutter.

U.S. Pat. No. 5,022,586, issued on Jun. 11, 1991 to W. R. Putnam, teaches a gutter cleaning device that includes an adjustable handle unit equipped with a shut-off valve operatively connected to a garden hose and provided with an elongated nozzle member having a shaft portion and a spray head portion with an elongated aperture. The shaft portion serves as an axle for an outer wheel member and an inner hub member. The hub member serves as a rolling support for the device. The wheel member serves as a guide as the device is moved along the gutter.

U.S. Pat. No. 5,386,942, issued on Feb. 7, 1995 to C. E. Ditle, shows a roof cleaner and downspout cleaner having a regulated supply of pressurized fluid delivered to an outlet end through one of several interchangeable outlet devices having an outlet flow nozzle for cleaning clogged debris from gutters and downspouts.

U.S. Pat. No. 5,390,853, issued on Feb. 21, 1995 to R. J. Ellul, shows a gutter cleaning tool that is adapted to be hooked over the edge of a gutter and to direct a stream of water therein so as to dislodge leaves or other debris in the gutter toward and down the downspout of the gutter. A plunger is provided for pushing such debris down the downspout.

U.S. Pat. No. 5,727,580, issued on Mar. 17, 1998 to J. W. Patterson, discloses an apparatus and method for cleaning overhead gutters. The apparatus includes two inverted J-shaped members connected by a hinge at the apex. Each J-shaped member as a scoop depending downwardly from the apex and a handle arm depending downwardly from the apex. The handle arm is longer than the scoop. The J-shaped members are hinged such that rotating the handle arms toward each other causes the scoops to rotate toward each other thereby grasping debris therebetween. The gutter cleaner includes a coupling for connecting the cleaner to a garden hose through a valve. Water is channeled to a scoop while a baffle directs the water into the scoop and under debris to dislodge and consolidate debris.

U.S. Pat. No. 8,409,365, issued on Apr. 2, 2003 to G. K. Cox, provides a gutter cleaning device that has nozzle body detachably coupled to a wand in fluid communication with a pressurized water source. The nozzle body has a fluid passage providing fluid communication to a first nozzle obtuse offset from a co-planar, simultaneously operating, second nozzle. The first nozzle on the second nozzle are offset by approximately 158°.

U.S. Patent Application Publication No. 2006/0289036, published on Dec. 28, 2006 to R. J. Hilton, discloses a gutter cleaning device having an elongated pole including a conduit extending therethrough for communication between a nozzle at a top end of the pole and a source of high-pressure compressed gas at a bottom end of the pole. A trigger mechanism at the source controls dispensing of the gas through the nozzle.

U.S. Patent Application Publication No. 2009/0127349, published on May 21, 2009 to N. DeLeo, shows a method and apparatus for maintaining roof gutters. The assembly includes an air supply coupled with a first pipe section. A receptacle holds material to be delivered to the gutter in fluid communication with the first pipe section. A second pipe section extends from the first pipe section and has a dispensing nozzle on the end thereof. The dispensing nozzle is disposed proximate to the roof or gutter. The first pipe section can be manipulated from the ground so the user, standing on the ground, can deliver material through the assembly to the gutter or roof.

It is an object of the present invention to provide a pressure spray washer that effectively removes leaves and debris from the interior of gutters.

It is another object of the present invention provide a pressure spray washer that has minimal weight.

It is another object of the present invention to provide a pressure spray washer that has minimum recoil.

It is another object of the present invention to provide a pressure spray washer that applies a high pressure spray.

It is another object of the present invention to provide a pressure spray washer that is easy to control.

It is another object of the present invention to provide a pressure spray washer that avoids damage to the roof and siding materials.

It is another object of the present invention to provide a pressure spray washer that is directable with accuracy.

It is another object of the present invention provide a pressure spray washer that avoids catching on internal gutter hangers.

It is a further object of the present invention to provide a pressure spray washer that rotates debris toward the edge of the gutter.

It is still a further object the present invention to provide a pressure spray washer that has no moving parts.

It is still a further object of the present invention to provide a pressure spray washer that has an indication of correct orientation of the washer.

These and other objects and advantages of the present invention will become apparent from a reading of the attached specification and appended claims.

BRIEF SUMMARY OF THE INVENTION

The present invention is a pressure spray washer for cleaning gutters. This pressure spray washer has a body having a curved outer surface. The body has an internal channel opening at one end of the body. The body is a plurality of orifices extending through the body so as to have one end opening to the internal channel and an opposite end opening at the exterior surface of the body. The body has a connector at one end of the internal channel. The connector is adapted to connect with a source of a pressurized fluid.

The body has a planar surface at the exterior surface thereof. The plurality of orifices open at or adjacent to this planar surface. The planar surface comprises a first planar surface on one side of the body and a second planar surface at an opposite side of the body. Each of the first and second planar surfaces has an indented area therein. The plurality of orifices open at this indented area. The indented areas are formed generally centrally of the planar surface. The indented area has a round wall extending toward the planar surface.

The body has a truncated ellipsoidal configuration. The curved outer surface includes a first curved surface formed at the bottom of the body and a second curve surface formed of the top of the body.

The plurality of orifices comprise three orifices opening at opposite sides of the body. Each of the three orifices extend at an acute angle from the internal channel toward the exterior surface. Each orifice of the three orifices at one side of the body radiates outwardly at an opposed fixed compound angle with respect to a corresponding orifice at an opposite side of the body. Each of the orifices extends from the periphery of an imaginary circle at a center of the internal channel toward a periphery of an imaginary circle at the exterior surface of the body. The imaginary circle at the center of the internal channel has a diameter greater than a diameter of the imaginary circle at the exterior surface of the body. The orifice extends from a point 60° offset from vertical on the imaginary circle in the center of the internal channel to a point offset by 30° from vertical on the imaginary circle at the exterior surface of the body. Each of the orifices are equally circumferentially spaced around the imaginary circles from each other. Each of the imaginary circles has a center on a common axis.

The body has a dimple formed on the exterior surface thereof. This dimple is indicative a proper orientation of the body with respect to the curve of the lance and the position of the user. The internal channel can be internally threaded to attach to a commercially available lance. The lance has a curvilinear shape. The curved lance is adapted to connect with a source of pressurized fluid.

This foregoing Section is intended to describe, with particularity, the preferred embodiments of the present invention. It is understood that modifications to these preferred embodiments can be made within the scope of the present claims. As such, this Section should not to be construed, in any way, as limiting of the broad scope of the present invention. The present invention should only be limited by the following claims and their legal equivalents.

DETAILED DESCRIPTION OF THE INVENTION

Figure 1:
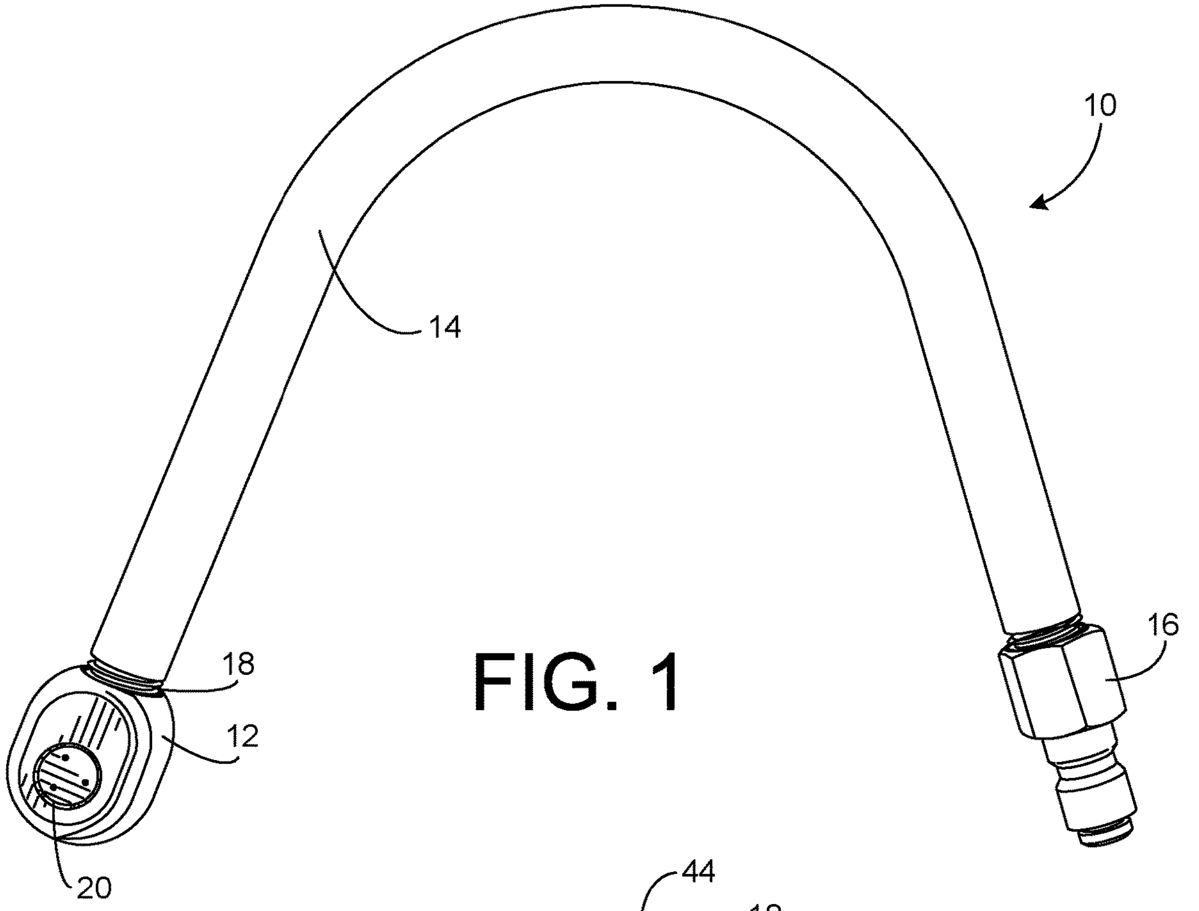
FIG. 1 is a side elevational view showing the pressure spray washer in accordance with teachings of the present invention.

Referring to FIG. 1, there shown the pressure spray washer 10 in accordance with teachings of the present invention. The pressure spray washer 10 is intended for use in the cleaning of leaves and debris from the interior of gutters. The pressure spray washer 10 includes a body 12 that is connected to a lance 14. Lance 14 has a connector 16 at an end opposite the body 12. The connector 16 is adapted to connect with a hose or conduit of pressurized fluid, such as air or water. Connector 16 can be a commercially available connector or it can be in the nature of a connector used in a design patent application to the present Applicant identified in U.S. Design patent application Ser. No. 29/839,143 filed on May 19, 2022. The body 12 has a connector 18 at the end of an internal channel. Connector 18 is adapted to connect with a end of the lance 14 such that the pressurized fluid can be delivered into the interior of the body 12. The body 12 has a plurality of orifices 20 that are adapted to direct the pressurized fluid outwardly thereof and into the gutter.

Figure 2:
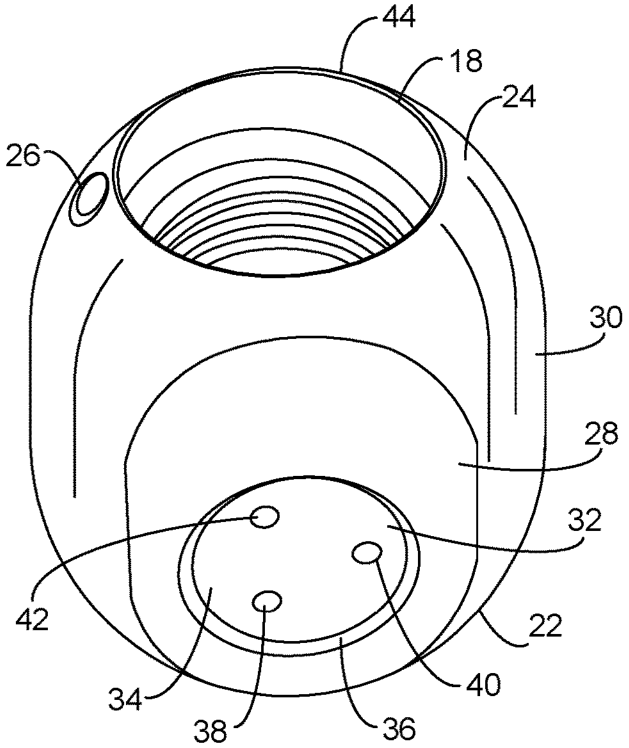
FIG. 2 is an upper perspective view of the body of the pressure washer of the present invention.

FIG. 2 illustrates the body 12 of the present invention. As can be seen, the body 12 includes the connector 18 at an upper surface thereof. Connector 18 can be in the nature of a quick-connect coupling or can be internally threaded (as shown in FIG. 2). The body 12 has a first curved outer surface 22 located at the bottom thereof and a second curved surface 24 located at the top thereof. Body 12 has a truncated ellipsoidal configuration. A dimple 26 is formed in the second curved surface 24 at the top of the body 12 generally adjacent to the connector 18. Dimple 26 provides an indication to a user of the proper orientation of the body 12 with respect to the lance 14. This allows the user to properly direct the fluid pressure, as required, into the gutter.

The body 12 includes a first planar surface 28 formed on an exterior surface 30 of the body 12. An indented area 32 is formed generally centrally of the planar surface 28. Indented area 32 also includes a planar surface 34. A generally round or tapered wall 36 extends from indented area 32 to the planar surface 28. As can be seen, orifices 38, 40 and 42 open at the indented area 34. The planar surface 28, along with the indented area 32, facilitates the ability of the body 12 to move within the gutter without hanging up on surfaces, such as gutter hangers. The location of the orifices 38, 40 and 42 on the indented area 32 further minimizes direct contact of the orifices with interior surfaces of the gutter.

Fundamentally, the pressurized fluid is introduced into the interior 44 of the body 12. The orifices 38, 40 and 42 will emit a strong spray of the pressurized fluid into the gutter. Importantly, the orifices 38, 40 and 42 will have a unique configuration and orientation.

Figure 3:
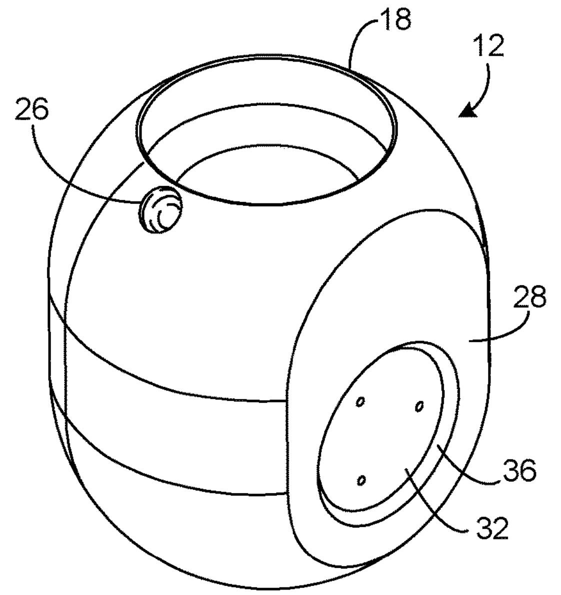
FIG. 3 is an upper perspective view from an opposite side of the body of the pressure spray washer of the present invention.

FIG. 3 shows the body 12 and, in particular, the indented area 32 as having the round wall 36 extending from they indented area 32 to the planar surface 28. The dimple 26 is illustrated as being a round surface generally adjacent to the connector 18 at the top of the body 12.

Figure 4:
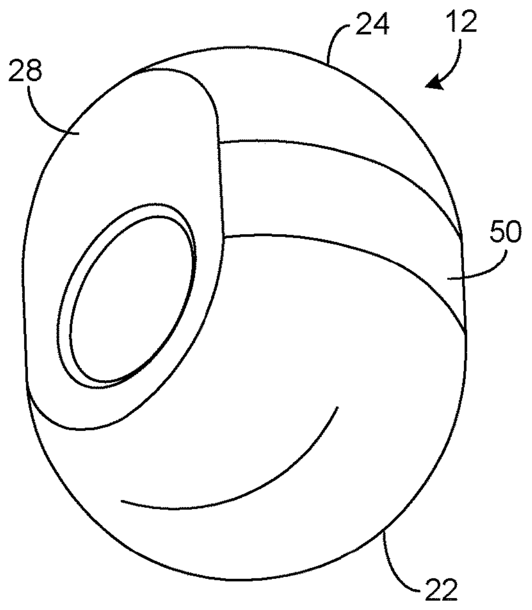
FIG. 4 is a bottom perspective view of the pressure spray washer of the present invention.

FIG. 4 shows the bottom of the body 12. It can be seen that the bottom surface 22 is curved and, in particular, semi-spherical. Similarly, the upper curved surface 24 is semispherical.

Figure 5:
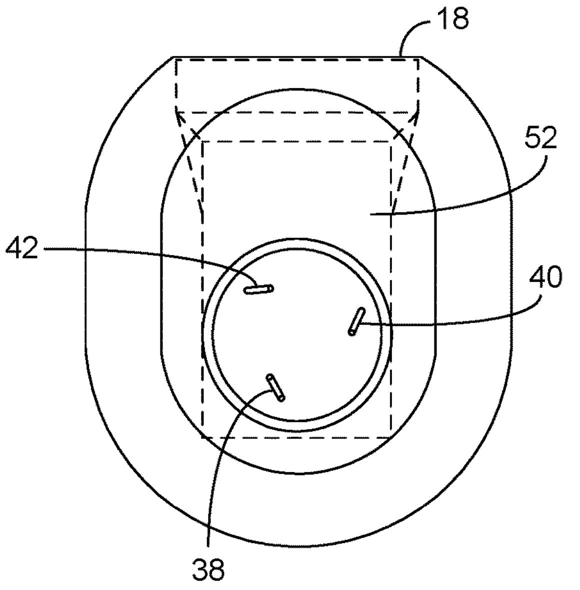
FIG. 5 is a cross-sectional view of the body of the pressure spray washer of the present invention.

FIG. 5 is a cross-sectional view of the body 12. In particular, it can be seen that the orifices 38, 40 and 42 extend at an angle from the internal chamber 52. The connector 18 is positioned at the top of the internal chamber 52. As such, pressurized fluid will flow into the internal chamber 52 and outwardly through the orifices 38, 40 and 42. The opposite side of body 12 will have a similar configuration of orifices (as will be described hereinafter). In particular, an orifice at one side of the body radiates outwardly at an opposed fixed compound angle relative to a corresponding orifice at the opposite side of the body.

Figure 6:
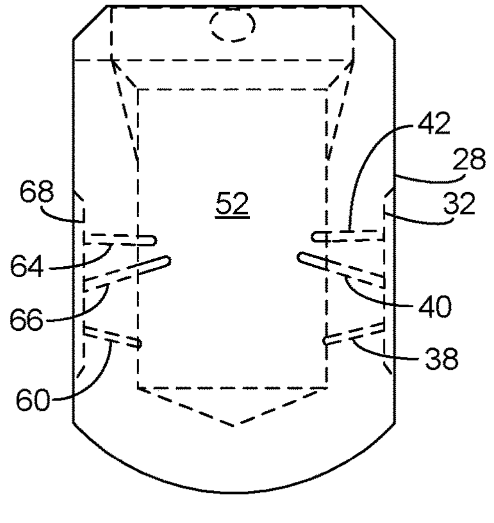
FIG. 6 is an opposite cross-sectional view of the body of the pressure spray washer of the present invention.

FIG. 6 is another cross-sectional view of the body 12. In FIG. 6, the configuration of the orifices 38, 40 and 42 is particularly illustrated. Orifices 38, 40 and 42 will extend into the internal channel 52. Orifices 38, 40 and 42 will open to the indented area 32 of the planar surface 28. Similarly, at the opposite side of the body 12 are orifices 60, 62 and 64. Orifice 60 will correspond with orifice 38. Orifice 66 will correspond with orifice 40. Orifice 64 will correspond orifice 42. As such, it can be seen how the orifices at one side of the body radiate outwardly at an opposed fixed compound angle with respect to a corresponding orifice at the opposite side of the body. Orifices 60, 62 and 64 have one end opening to the internal channel 52 and an opposite end opening to the indented area 68 at the opposite side of the body.

Figure 7:
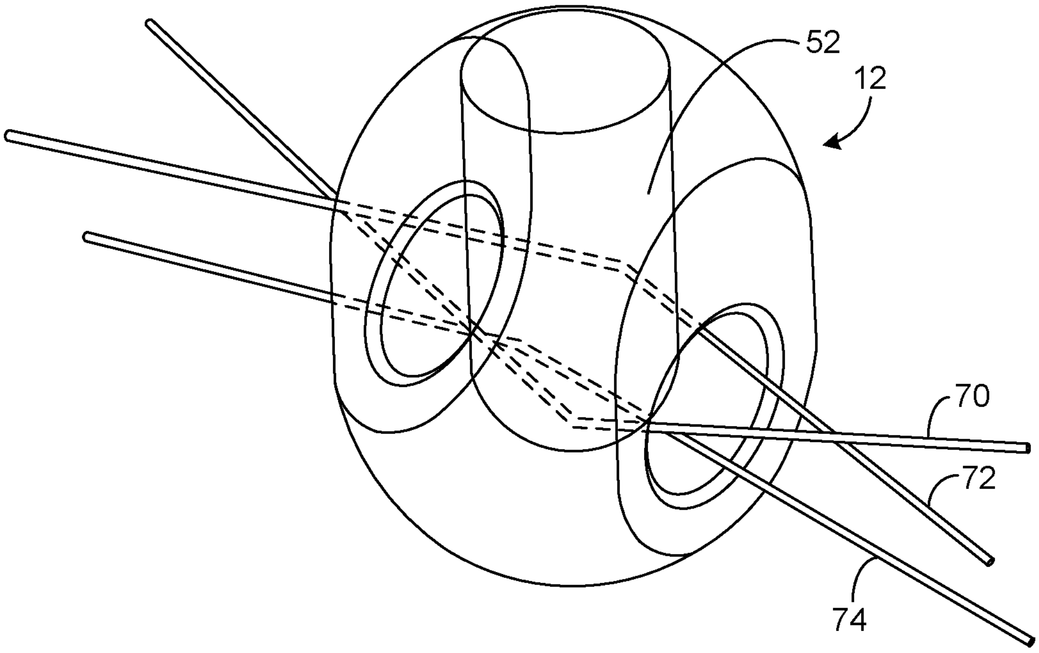
FIG. 7 is an illustration of the orientation of orifices associated with the body of the pressure spray washer of the present invention.

FIG. 7 illustrates the spray pattern associated with the orifices of the body 12. The configuration of the orifices creates a very unique spray pattern that facilitates the ability for the pressure spray washer to effectively clean debris from the interior of gutters without damaging siding and roofing materials. This arrangement further facilitates control of the pressure washer. In particular, it can be seen that spray 70 is configured so as to pass from the internal channel 52 outwardly of the body 12 through the channels 38 and 60 at opposite sides of the body. Spray 72 is configured so as to pass outwardly of the body 12 through orifices 40 and 66. Spray 74 is emitted from the body 12 through orifices 64 and 42.

Figure 8:
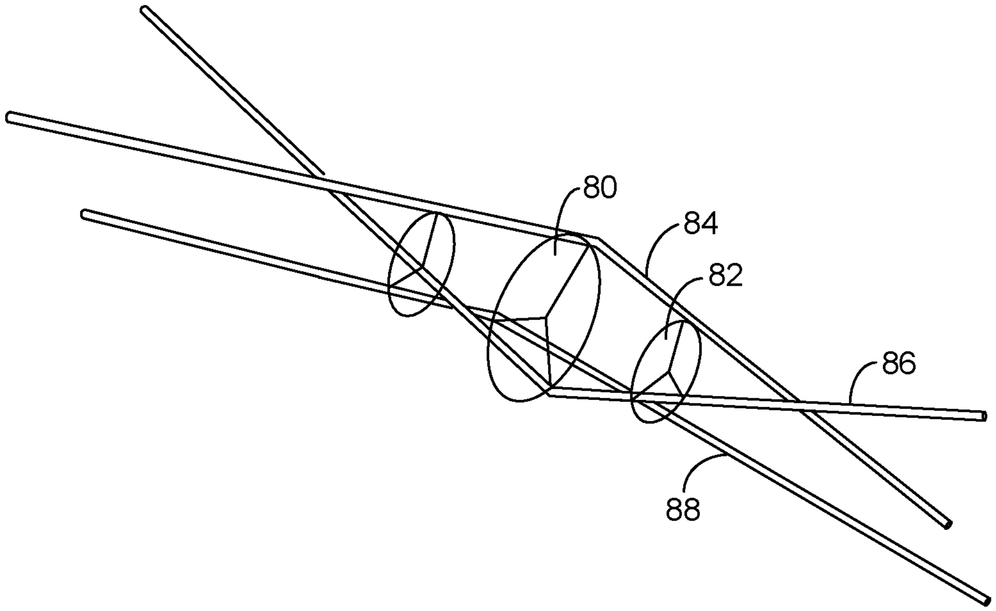
FIG. 8 is a diagrammatic illustration of the orientation of the orifices that are formed in the body of the pressure spray washer of the present invention.

FIG. 8 illustrates the particular configuration of the orifices. As can be seen in FIG. 8, each of the orifices described herein previously extends from a periphery of an imaginary circle 80 at the center of the internal channel 52 toward an imaginary circle 82 at the exterior surface of the body and, in particular, at the indented area of the body. It can be seen that the imaginary circle 80 at the center of the internal channel 52 has a diameter greater than a diameter of the imaginary circle 82 at the exterior surface of the body. One of the orifices 84 extends from a point 60° offset from vertical on the imaginary circle 80 to a point offset approximately 30° offset from vertical on the imaginary circle 82. FIG. 8 shows that each of the orifices 84, 86 and 88 are equally circumferentially spaced around the imaginary circles 80 and 82 with respect to each other. Each of the imaginary circles 80 and 82 has a center on a common axis. The lines showing orifices 84, 86 and 88 are simply indicators showing the path of formation of the orifices in the body 12. Ultimately, this path will also be in the direction of spray emitted from the body 12.

Figure 9:
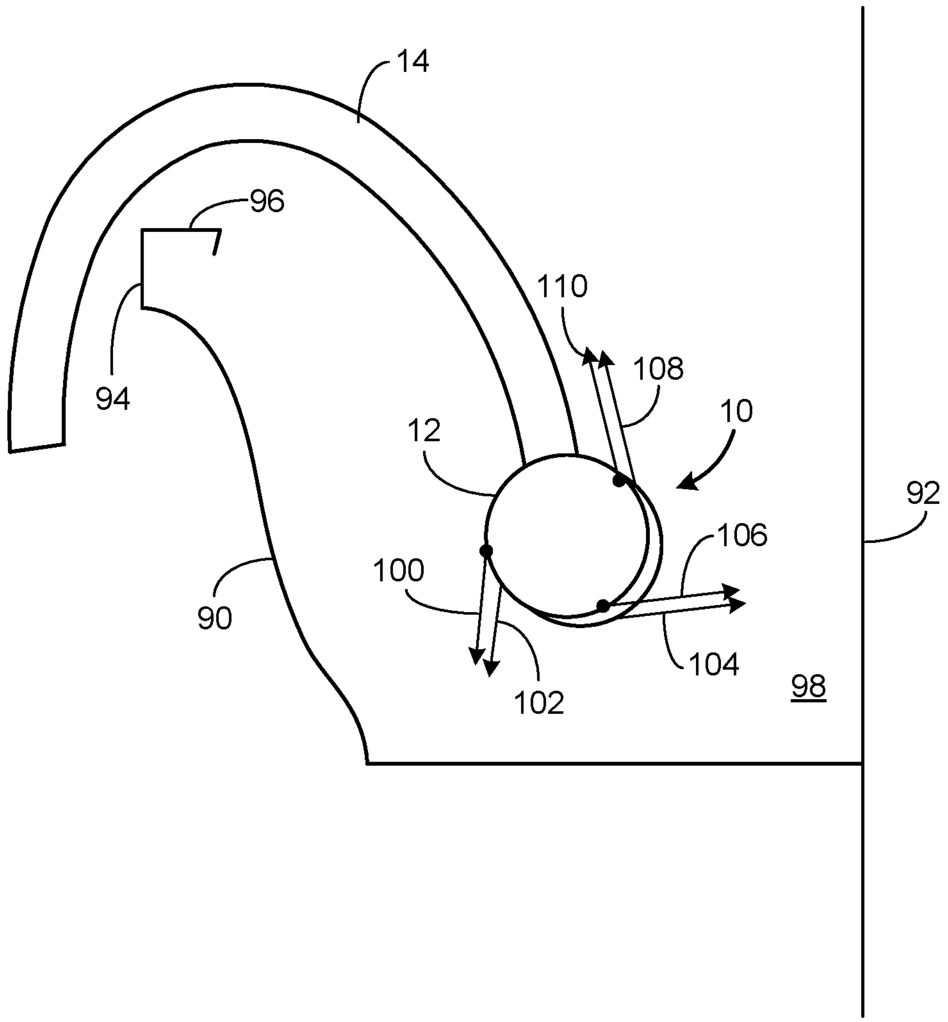
FIG. 9 is a diagrammatic illustration showing the operation of the pressure spray washer of the present invention in conjunction with a gutter.

FIG. 9 shows the pressure spray washer 10 of the present invention as located within a gutter 90. Gutter 90 is affixed to the wall 92 and, presumably, has hangers that support the opposite side 94 of the gutter in a proper position. Lance 14 is curved and configured so as to extend over the lip 96 of gutter 90 such that the body 12 is located within the interior 98 of the gutter 90. Arrows 100, 102, 104, 106, 108 and 110 illustrate the pattern in which pressurized fluid is released by the body 12 into the interior 98 of the gutter 90.

The pressure spray washer 10 of the present invention was developed after building and testing many prototypes. This design is a lightweight and streamlined attachment. There are two opposing sets of three stationary jets that efficiently rotate debris out of the gutter and away from the roof. The pressure spray washer of the present invention has no moving parts. In order to rotate debris away from the roof on both sides of the nozzle, a novel orifice configuration having opposed, fixed compound angles is provided. This configuration requires that the orifices be drilled with reverse angles on opposite sides. It was found that the truncated ellipsoid configuration of the body of the present invention was most effective to avoid ensnarement on the gutter hangers and any other surfaces within the gutter. The assembled product includes the body 12 with its associated jets and a commercially-available curved steel lance and quick-connect plug adapter. This allows an extension pole or pressure washer gun to be connected thereto. This configuration rotates debris over the front of the gutter and away from the roof while producing no recoil on a long telescoping pole.

The foregoing disclosure and description of the invention is illustrative and explanatory thereof. Various changes in the details of the illustrated construction can be made is the scope of the present invention without departing from the true spirit of the invention. The present invention should only be limited by the following claims and their legal equivalents.

I claim:

1. A pressure spray washer for cleaning gutters, the pressure spray washer comprising:

a body having a curved outer surface, said body having an internal channel opening at one end of said body, said body having a plurality of orifices extending through said body so as to have one end opening to the internal channel and an opposite end opening at an exterior surface of said body, said body having a connector at one end of the internal channel, the connector adapted to connect with a source of a pressurized fluid, said body having a planar surface at the exterior surface thereof, the plurality of orifices opening at or adjacent to the planar surface, the planar surface comprising a first planar surface of one side of said body and a second planar surface at an opposite side of said body, each of the first and second planar surfaces having an indented area therein, said plurality of orifices opening at the indented area.

2. The pressure spray washer of claim 1, the indented area formed generally centrally of the planar surface, the indented area having a round tapered wall extending toward the planar surface.

3. The pressure spray washer of claim 1, said plurality of orifices comprising three orifices opening at opposite sides of said body.

4. The pressure spray washer of claim 3, each of the three orifices extending at an angle from the internal channel toward the exterior surface.

5. The pressure spray washer of claim 4, one orifice of the three orifices at one side of said body radiating outwardly at an opposed fixed compound angle with respect to a corresponding orifice of the three orifices at an opposite side of said body.

6. The pressure spray washer of claim 3, each of the orifices extending from a periphery of an imaginary circle in the center of the internal channel toward a periphery of an imaginary circle at the exterior surface of said body.

7. The pressure spray washer of claim 6, the imaginary circle at the center of the internal channel having a diameter greater than a diameter of the imaginary circle at the exterior surface of said body.

8. The pressure spray washer of claim 7, one of the orifices extending from a point 60° offset from vertical on the imaginary circle in the center of the internal channel to a point offset by 30° from vertical on an imaginary circle at the exterior surface of said body.

9. The pressure spray washer of claim 8, each of the orifices being equally circumferentially spaced around the imaginary circle from each other.

10. The pressure spray washer of claim 9, each of the imaginary circles having a center on a common axis.

11. The pressure spray washer of claim 1, said internal channel having a quick-connect coupling or other commercially-available coupling therein, the coupling being adapted to connect with a source of pressurized fluid.

12. The pressure spray washer of claim 11, said internal channel being internally threaded.

13. The pressure spray washer of claim 12, said lance having a curvilinear shape, said lance having a connector at an end opposite said body that is adapted to connect with a conduit for the pressurized fluid.

14. The pressure spray washer of claim 1, further comprising:

a curved lance connected to the connector of said body, said curved lance adapted to direct the pressurized fluid toward the internal channel.

15. A pressure spray washer for cleaning gutters, the pressure spray washer comprising:

a body having a curved outer surface, said body having an internal channel opening at one end of said body, said body having a plurality of orifices extending through said body so as to have one end opening to the internal channel and an opposite end opening at an exterior surface of said body, said body having a connector at one end of the internal channel, the connector adapted to connect with a source of a pressurized fluid, said body having a truncated ellipsoidal configuration, the curved outer surface comprising a first curved surface formed at a bottom of said body and a second curved surface formed at the top of said body.

16. A pressure spray washer for cleaning gutters, the pressure spray washer comprising:

a body having a curved outer surface, said body having an internal channel opening at one end of said body, said body having a plurality of orifices extending through said body so as to have one end opening to the internal channel and an opposite end opening at an exterior surface of said body, said body having a connector at one end of the internal channel, the connector adapted to connect with a source of a pressurized fluid, said body having a dimple formed on an exterior surface thereof, the dimple being indicative of an orientation of the body.

* * * * *